Dec. 22, 1942.    J. BERGER    2,305,759
BRAKE APPLIANCE
Filed Nov. 13, 1939    2 Sheets-Sheet 1

Inventor
Julius Berger
By E. F. Wenderoth
Attorney

Dec. 22, 1942.    J. BERGER    2,305,759
BRAKE APPLIANCE
Filed Nov. 13, 1939    2 Sheets-Sheet 2

Inventor
Julius Berger
By
E. F. Wenderoth
Attorney

Patented Dec. 22, 1942

2,305,759

UNITED STATES PATENT OFFICE 2,305,759

BRAKE APPLIANCE

Julius Berger, Berlin-Wilhelmsruh, Germany;
vested in the Alien Property Custodian Application November 13, 1939, Serial No. 304,225
In Germany August 3, 1939

2 Claims. (Cl. 303—6)

The present invention relates to braking plants and more particularly refers to a braking arrangement adapted to be used in connection with aircrafts and by which large brake pressures may be caused to act upon the wheels to be braked.

As is well known, large aircrafts often are provided with four landing wheels arranged in twin form. To brake the considerable landing energy of large aircrafts, particularly effective brakes and in many cases double brakes for each wheel of the carriage are required. The brake volume of such braking plants, having for instance four wheels and eight brakes, however, is too large to be brought to action directly by the foot of the pilot.

In all cases in which large brake pressures are required, the subject matter of the invention is of great advantage according to which the brake pressure medium is supplied by a power driven pump to the brake and in the pipe carrying the pressure medium a control mechanism maintaining the brake pressure proportionally to the force applied to the brake pedal is provided.

Now, it would appear to be evident to use for these purposes the hydraulic arrangement always present in aircrafts, but this again often would lead to the greatest difficulties for the reason that the hydraulic arrangement in the aircraft is not available for use as soon as the driving motors break down. Therefore, a hydraulic accumulator would have to be built in to warrant the safe appliance of the brake even on break down of the motors. By mounting a hydraulic accumulator, however, the weight of the aircraft would considerably be increased again which under all circumstances must be prevented if possible.

A current circuit which by mounting an accumulator would be independent on the break down of one or the other driving motor always is present in aircrafts so that by the use of this circuit for obtaining the required brake pressure the best guarantee would be given for a safe operation of the brakes without increasing the weight of the aircraft.

In the accompanying drawings one construction according to the invention is shown by way of example.

Figure 1:
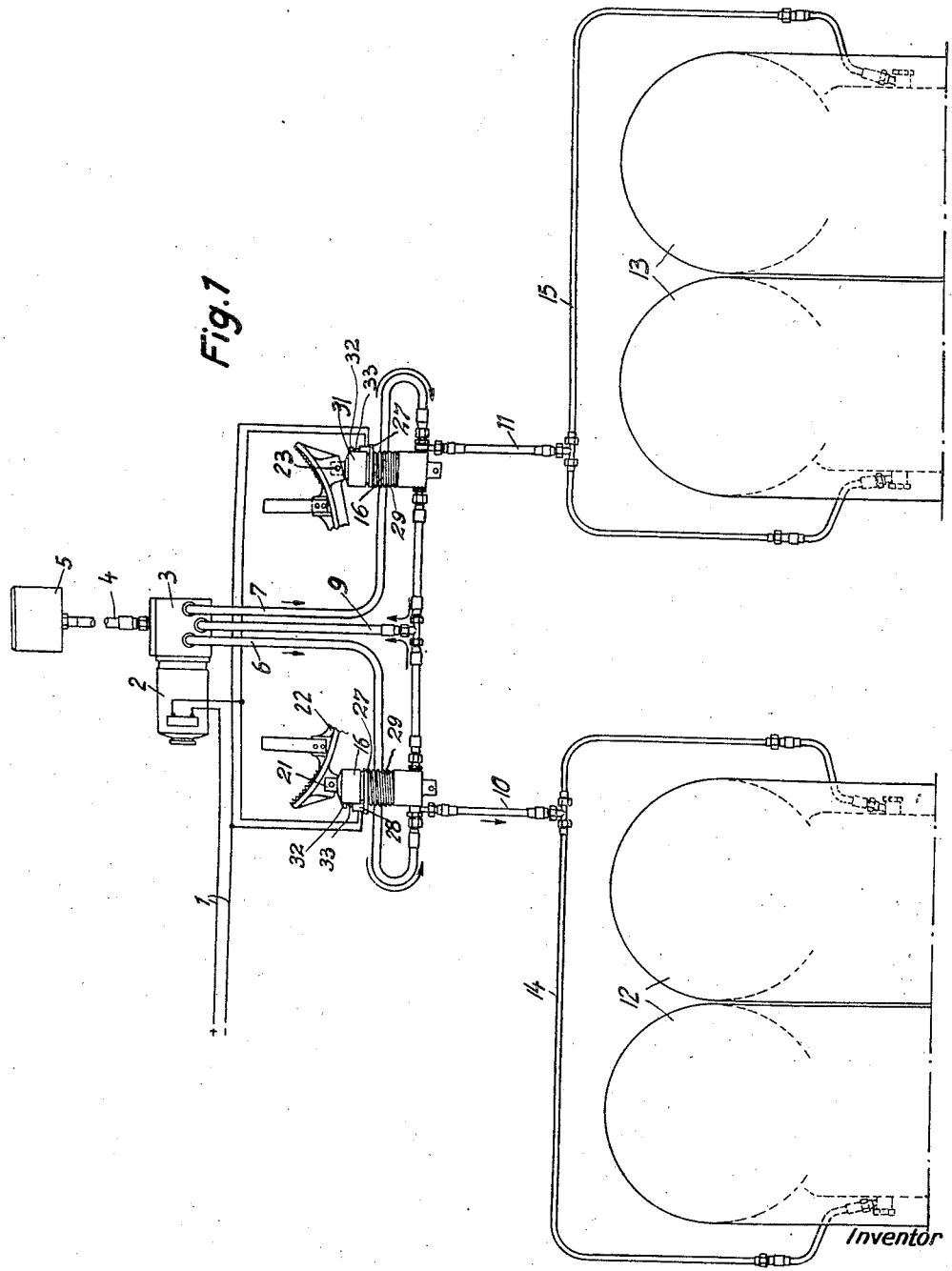
Figure 2:
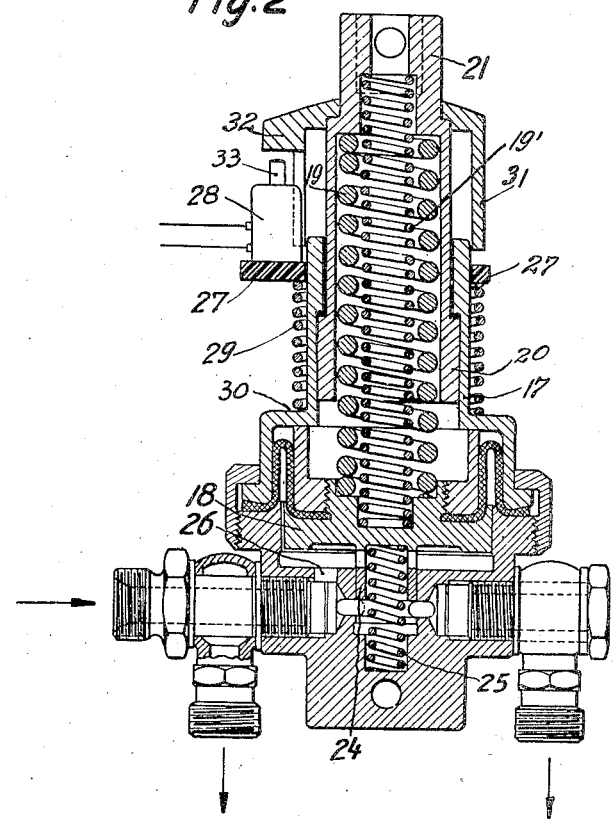

In these drawings:

Fig. 1 shows a diagrammatic view of a brake arrangement according to the invention and Fig. 2 represents a sectional detail of the control mechanism.

An electromotor 2 arranged in the circuit 1 drives a pump 3 to which pressure medium, for instance oil, is supplied from a tank 5 by way of a pipe 4. Pipes 6 and 7 formed as by-pass pipes branch from the pump 3 and are connected again to the pump 3 by way of a pipe 9. From the by-pass pipes 6 and 7 pipes 10 and 11 respectively branch off which lead to pipes 14 and 15 respectively connected to the brakes of the wheels 12 and 13 respectively arranged in twin form. In each of the by-pass pipes 6 and 7 a control device, generally designated 16, is arranged in the direction of flow behind the corresponding pipes 10 and 11 respectively. This control device 16 is shown in detail in Fig. 2 and, as may be seen from this figure, a valve formed as a piston is arranged in a cylinder 17. The piston 18 is controlled by springs 19 and 19'. The other end of the springs 19 and 19' bears against a second piston 20, the rod 21 of which may be controlled by the pedal 22 and 23 respectively. The valve proper is formed by a projection 24 of the piston 18 and this projection again is subjected to the action of a weak spring 25. Between the pipes 10 and 11 and the corresponding control device 16 each of the by-pass pipes 6 and 7 is connected to the lower portion of the cylinder 17 by way of a passage 26 so that the pressure medium supplied by way of the by-pass pipes 6 and 7 may act upon the undersurface of the piston 18 and move the latter upwardly against the pressure of the springs 19 and 19'.

The cylinder 17 is surrounded by an insulating ring 27 carrying a switch 28. The insulating ring 27 is acted upon by a spring 29, the other end of which bears against a shoulder 30 of the piston 17. The rod 21 is surrounded by a cap 31 a projection 32 of which may press the button 33 of the switch 28. If the brake is released, the switch 28 disconnects the circuit of the electromotor 2, whereas, if the brake operation is initiated by pressure upon the pedal 22 or 23, the circuit of the electromotor 2 is closed immediately by the pressure of the projection 32 upon the button 33, whereby the pump 3 is caused to act in order to supply the pressure medium by way of the pipes 6 and 7 or 6 or 7 respectively.

As soon as pressure is applied to the pedal 22 or 23, the corresponding piston 18 of the control device 16 after overcoming the pressure of the springs 19, 19' moves downwardly, whereby, also after overcoming the pressure of the spring 25, the projection 24 of the piston 18 closes the by-pass pipe 6 or 7 respectively, so that now by way of the pipes 6, 10, 14 or 7, 11, 15 respectively the full pressure exerted by the pump 3 acts upon the brakes of the wheels 12 or 13 respectively. By reducing the pressure exerted upon the brake pedal 22 or 23 respectively, the piston 18 moves upwardly for a more or less larger amount so that its projection 24 more or less uncovers the opening of the corresponding by-pass pipe 6 or 7 so that a larger or smaller amount of the pressure medium only flows in circulation without acting upon the brakes, whereby the power applied to the brake pedal always is maintained proportionally to the brake pressure and whereby, moreover, the desired braking of the one or the other pair of wheels 12 and 13 respectively may be obtained.

What I claim is:

1. A brake appliance comprising brakes, a pedal, a feed pump for supplying a pressure medium to said brakes, an electrical motor for driving said feed pump, a circuit for said motor, a pipe line connecting said feed pump to said brakes, a throttle valve in said pipe line controlled by said pedal for maintaining the brake pressure proportional to the power applied to said pedal and a switch in said motor circuit controlled by said throttle valve.

2. A construction as set forth in claim 1 in which said switch is closed only if pressure is applied to said pedal.

JULIUS BERGER.